June 22, 1965
K. L. HUGET
3,190,978
ELECTRICAL CONNECTING MEANS WITH IDENTICAL ROTARY CONNECTORS
Filed Jan. 15, 1962
3 Sheets-Sheet 1
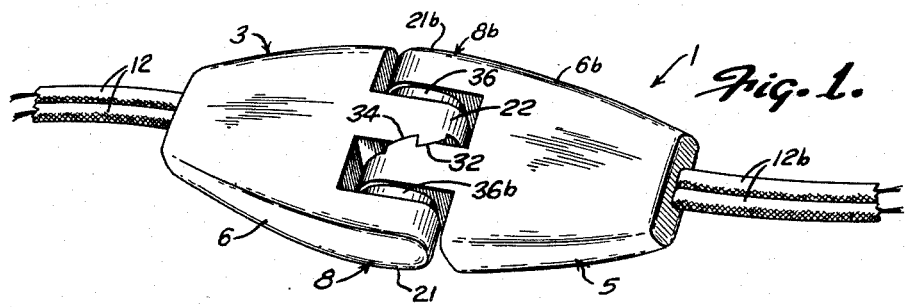
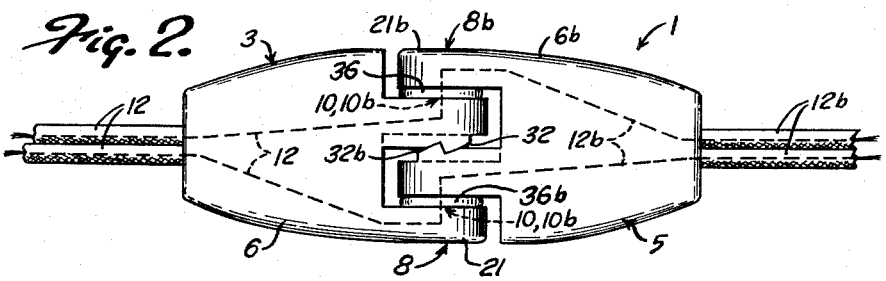
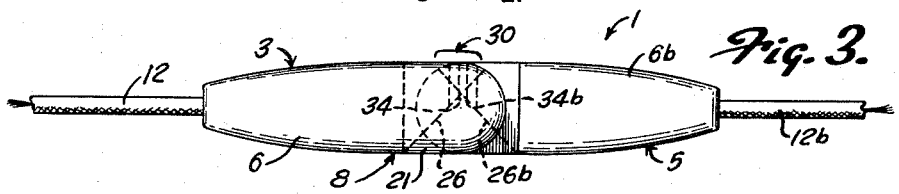
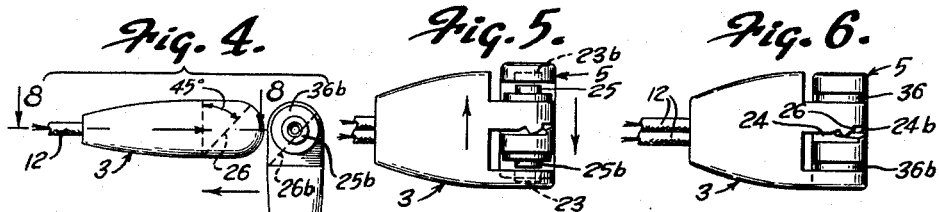
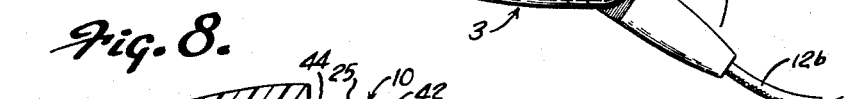
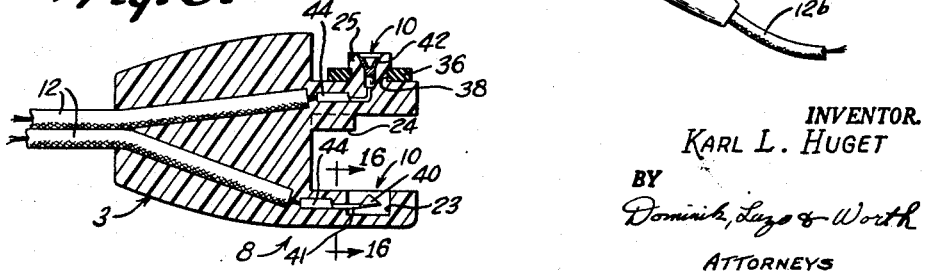
INVENTOR.
KARL L. HUGET
BY
Dominik, Lugo & Worth
ATTORNEYS June 22, 1965  K. L. HUGET  3,190,978
ELECTRICAL CONNECTING MEANS WITH IDENTICAL
ROTARY CONNECTORS
Filed Jan. 15, 1962  3 Sheets-Sheet 2
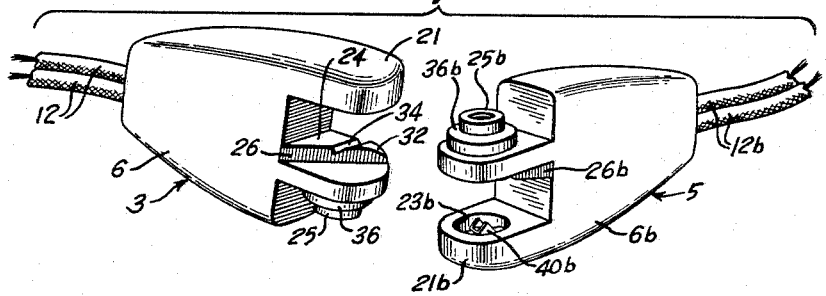
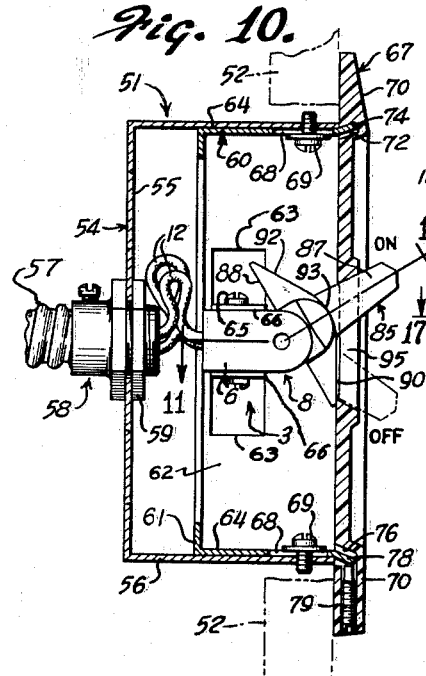
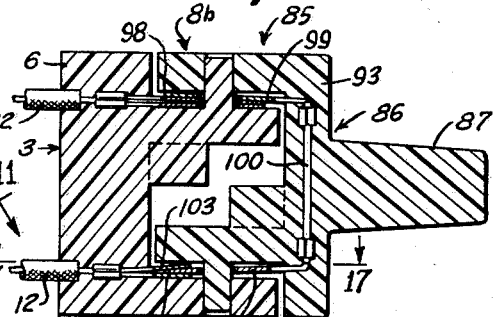
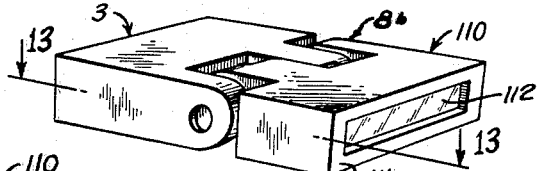
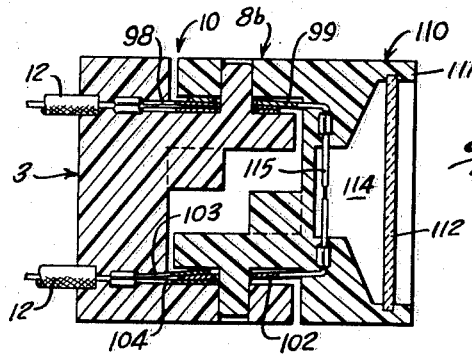
INVENTOR.
KARL L. HUGET
BY
Dominik Lazo & Worth
ATTORNEYS June 22, 1965
K. L. HUGET
3,190,978
ELECTRICAL CONNECTING MEANS WITH IDENTICAL ROTARY CONNECTORS
Filed Jan. 15, 1962
3 Sheets-Sheet 3
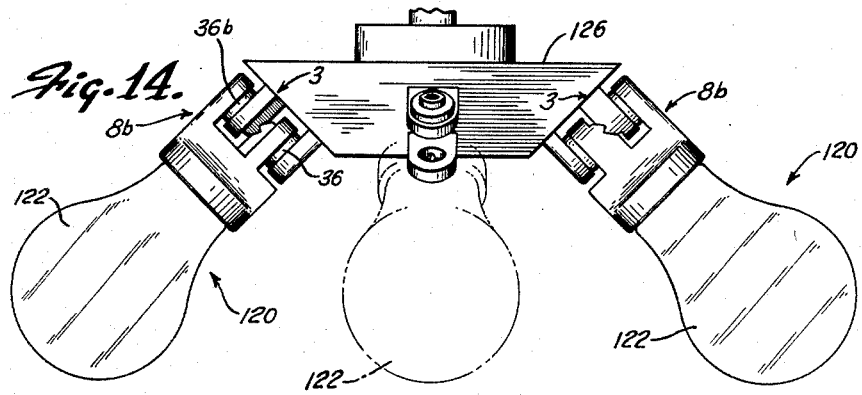
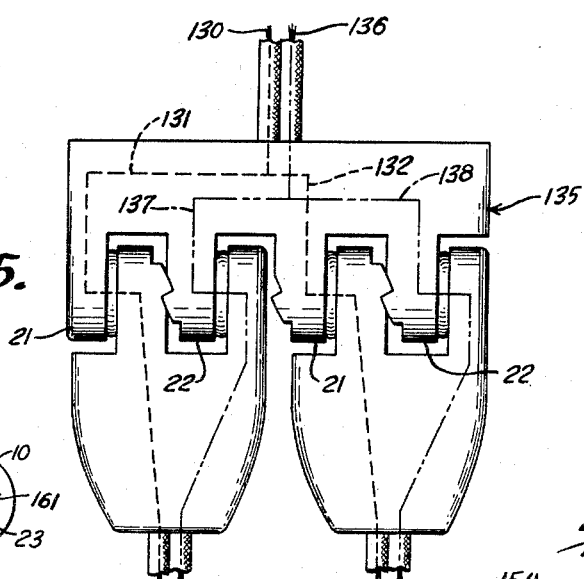
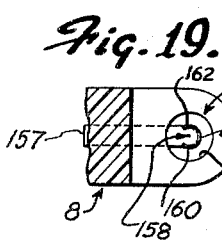
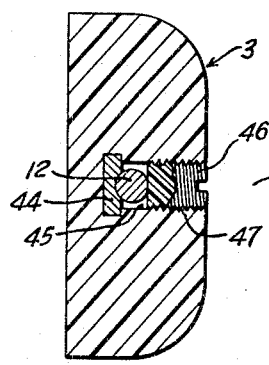
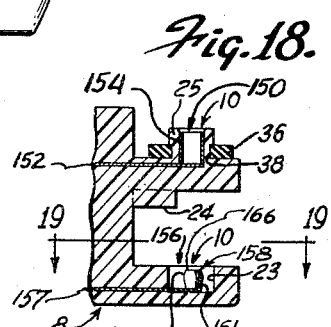
INVENTOR.
KARL L. HUGET
BY
Dominik Lazo & Worth
ATTORNEYS

United States Patent Office 3,190,978
Patented June 22, 1965

3,190,978
ELECTRICAL CONNECTING MEANS WITH IDENTICAL ROTARY CONNECTORS
Karl L. Huget, 310 N. Elm Grove Road, Brookfield, Wis.
Filed Jan. 15, 1962, Ser. No. 166,271
14 Claims. (Cl. 200—51)

The present invention relates to electrical connecting means. One aspect of the invention resides in adapting to electrical equipment a "Quick Release Pivotal Connection" patented by me on December 13, 1960 in United States Patent No. 2,963,734.

In making temporary electrical extension connections means are generally provided to effect a series of connections from a source of electricity (e.g. a wall socket) through one or more intermediate extension cords to the electrical load. Intermediate extension cords have heretofore had male and female connecting means respectively disposed on opposite ends. Extension cords located at the opposite ends of the series of connections frequently have or require special adaptors to connect to the source of electricity (e.g. to change from circular to rectangular connector prong shape) and to the load (e.g. a light bulb socket). Interchangeability is frequently lacking as among the various end and intermediate connections, as well as the connections at the source and load.

It is evident that a variety of adaptors, terminal connectors, load connectors, and the like need to be kept on hand to enable expeditious completion of temporary circuits embodying electrical extension connections. This can be particularly true on construction sites where economy of labor and efficiency of construction dictate that power be readily available at a variety of locations.

Permanent circuits are subject to similar or identical problems.

Additionally, special or unusual conditions of service can require that the individual electrical connections, whether temporary or permanent, be weatherproof, waterproof, explosion proof and so forth. Examples of such conditions include outdoor (e.g. Christmas tree) light displays, construction site electrical extensions, research and development facilities which operate in hazardous or explosive atmospheres, and marine applications, to name a few.

The present invention has for an object an electrical connecting means of enhanced interchangeability.

A further object of the invention is an electrical connecting means which facilitates the making of electrical connections. A correlative object is an electrical connector enabling the making of quick release electrical connections.

Still another object is an electrical connecting means which is suitable for making connections of the character needed for special or unusual service conditions.

A feature of electrical connecting means according to the invention is that connections can be made without any appreciable distortion of the mating connector structural portions. Thus a non-resilient structure is provided and materials suitable therefor can be used.

The invention comprehends a wide variety of electrical connecting means each directed to one or more of the objects. By way of example and not intending to limit the invention thereto, specific embodiments include a quick release electrical coupling, an electrical lamp, an electrical switch, and an electrical receptacle.

An electrical coupling according to the invention includes two mutually engageable parts, preferably includes two parts which are constructed alike mechanically and which are mutually engageable mechanically and electrically, and most preferably includes two mechanically identical parts which are structurally and electrically interconnectable with each other. Male and female electrical connectors as heretofore known are thereby eliminated. The two parts advantageously include structural elements (connector portions) of the character set forth in the said United States Patent 2,963,734 whereby a quick release connection can be effectuated. By means of gaskets and cam means the electrical coupling is rendered suitable for service in special or unusual conditions of service.

An electric lamp as included in the invention preferably is of the incandescent type and includes a bulb assembly as the body portion, advantageously formed integrally with the base member. The base member is interconnectable with, for example, one of the members involved in the electrical coupling whereby the necessity for a special socket to accommodate the lamp is eliminated. It will be observed that such a lamp structure advantageously minimizes the requirement for establishing a glass-to-metal seal at the lamp base as is common practice in previously known incandescent lamps.

Further, an electrical receptacle is contemplated, mountable on a wall or ceiling, and having a structure interconnectable with the lamp base member or with one of the coupling members. An electrical receptacle of such character thus eliminates the necessity, as heretofore, of providing a special plug to adapt a lamp receptacle or socket for connection to an extension cord.

An electrical switch as contemplated by the invention includes a switch handle and a base member suitable for mounting on a wall. The connector portions of the base member and switch handle are structurally interconnectable in a fashion similar to that of the coupling. The extremely simple construction offers advantages in mass production at low cost, in simple and safe inspection, and in simple and safe installation and repairs. Moreover, such a switch is silent in operation.

The invention further contemplates an electrical fuse structurally very similar to the switch. Such a fuse is readily replaceable and eliminates replacement difficulties common to present screw-in type of fuses such as sticking after being in use for some time.

Thus, specific objects of the invention include but are not restricted to one or more of the following:

provision of an electrical connecting means having two mating members with connector portions which are mechanically constructed alike, preferably being mechanically identical, and which include mating electrical junction establishing means which in one embodiment are also identical;

provision of an electrical coupling;

provision of an electric lamp having a base member integral with the bulb;

provision of an electrical receptacle which is directly connectable to an electric lamp or to an electrical coupling without the agency of an adaptor or socket for one or the other;

provision of an electrical switch;

provision of an electrical fuse.

Where desirable, the invention comprehends the employment of detention means to avoid accidental disconnection.

Where direct current circuits are involved, one feature of the invention provides a means for insuring connections are made which maintain the polarity correct.

Other objects, advantages and features will become apparent from the following specification when read in conjunction with the annexed drawings wherein:

FIG. 1 is a perspective view of an assembled electrical coupling.

FIG. 2 is a side view of the assembled coupling of FIG. 1, showing in dotted lines the electrical circuit therethrough.

FIG. 3 is a top view of the assembly of FIG. 1 illustrating in dotted lines certain of the mechanical features of the connector portions of the respective parts making up the assembly.

FIGS. 4, 5, 6 and 7 are sequential views illustrating a manner of assembling electrical connecting means, using the coupling of FIGS. 1-3 as an example, the views being from the top, side, side and top, respectively.

FIG. 8 is a cross-section view of an electrical connecting means, using a coupling as seen along section 8—8 of FIG. 4 for example, illustrating a preferred electrical contact means.

FIG. 9 is a perspective view of the dissembled coupling of FIG. 1 and illustrates various mechanical and electrical features of an electrical connecting means according to the invention.

FIG. 10 is a side cross-sectional assembly view of a receptacle, wall plate, and switch, according to the invention.

FIG. 11 is a top cross-sectional view of the switch of FIG. 10, as viewed along section 11—11 of FIG. 10.

FIG. 12 is a perspective view of an electrical fuse suitable for mounting in the receptacle of FIG. 11.

FIG. 13 is a cross section assembly view of the fuse as seen along section 13—13 of FIG. 12.

FIG. 14 is an assembly view showing a light bulb and a multiple connector mounting receptacle therefor, both incorporating a connector portion according to the invention.

FIG. 15 represents an assembly view of one embodiment of a multiple connector showing the electrical circuit therethrough in dotted lines.

FIG. 16 represents in enlarged cross section one embodiment for establishing a wire-to-terminal connection in an electrical connecting means according to the invention and as seen along section 16—16 of FIG. 8.

FIG. 17 is a cross section through section 17—17 of FIG. 12.

FIG. 18 is another embodiment of an electrical connecting means.

FIG. 19 is a view as seen from 19—19 of FIG. 18.

Throughout the specification, the same reference numbers are used to refer to the same part. Inasmuch in the preferred embodiment the respective connector portions are constructed alike, and even more preferably are identical to each other, only one connector portion of one part will be described. On those occasions where both parts are referred to by reference number, the second or other part will use the same reference number with the suffix "b" to distinguish the constituent portions of the second of the respective parts from those of the other part.

General

Referring now to FIGS. 1-9 there is illustrated an electrical coupling 1 that is representative of an electrical connecting means according to the invention. For convenience, the electrical connecting means of FIGS. 1-9 will hereinafter be referred to as an electrical coupling.

The electrical coupling 1 comprises a first connecting part 3 and a second connecting part 5. The respective parts 3-5 are mechanically and electrically connectable one to another so that an electrical junction is established when the respective parts have been appropriately positioned relative to one another. The manner of appropriately positioning the respective parts is described below with respect to FIGS. 4-7.

The first connecting part 3 has a body 6 on which is mounted a connector portion 8. The second connecting part is constructed in like fashion, and includes a body 6b and a connector portion 8b. The respective connector portions 8, 8b on each of the parts are preferably constructed alike and most preferably are mechanically identical to the end that they are mutually engageable with each other in a mechanical fashion, whereby an electrical junction is established upon such mutual engagement.

Each of the connecting parts also includes a means 10 for establishing an electrical junction responsive to connecting the first and second parts by the mutual engagement of the respective connector portions. (See FIGS. 2, 8.) The means for establishing 10, 10b on the respective parts are preferably identical, but not necessarily so as illustrated in FIGS. 10-13 for example. The junction establishing means 10 on each part is connected to a wire 12 or other suitable means for conducting electricity. The wires may advantageously be led through the body and the connector portion, being connected to electrical terminals in the fashion later described with respect to FIG. 16 or by other suitable means.

Each of the connector portions includes a first projection 21 and a second projection 22. The two projections are spaced apart. The projection has therein a socket 23. The second projection has on the end thereof facing toward the socket a shoulder 24. On the opposite end of the second projection, that is, facing away from the first projection on each part, is mounted a pin 25. Preferably, the socket is circular in cross section and so is the pin. The pin is of a diameter suitable for insertion in the socket and preferably is coaxially aligned with the socket. The length of the second projection on each part, including the length of said pin but excluding that of the shoulder, is slightly less than the distance on each part between the first projection and the shoulder whereby in assembling first and second parts the pin and second projection of one part are insertable between the first and second projection of the other part without having to spring or otherwise elastically deform either of the respective parts in the course of assembling an electrical connecting means according to the invention.

The shoulder has a face 26 which terminates the outward extension of the shoulder from the body portion and serves to connect the shoulder with the end of the second projection which faces toward the socket. The face may be at any suitable angle, but preferably is at 45° with the longitudinal axis of the body of the part on which it is mounted. The 45° angle is preferable because it enables aligning the respective bodies along the longitudinal axis when the electrical connecting means is assembled. Were the face at 90° to the body axis, it would result in disposing the respective parts forming a connecting means at an angle, most likely at right angles with each other. While any face angle is contemplated for use in the invention, further description will be with reference to the 45° angle.

The face is preferably a flat plane surface parallel with the axis through the socket 23. The face on each part is also preferably arranged, as described in my above-mentioned patent, so that it aids in aligning the pin of the second part with the socket of the first part when assembling the two parts. Hence, the face may be disposed as shown for example in FIG. 4.

When assembling the respective parts 3, 5 to form a coupling or other electrical connecting means, the two parts are first positioned so that their respective faces are substantially parallel and so that the second projection and pin of each can be moved between the first and second projections of the other part (see FIGS. 4-7). With the parts in this position, as illustrated in FIG. 4, the second projections of each part are moved between the two projections on the other part so that the respective faces are brought into abutting relationship and so that the pin on each part is aligned with the socket on the other part, as best seen in FIG. 5. In achieving the pin-and-socket alignment, the two parts are moved relative to each other as shown by the arrows in FIG. 4. Once the faces have been brought into abutting relationship with the pins and sockets aligned, a lateral movement in the direction of the arrows of FIG. 5 serves to insert the respective pins of the first and second parts of the sockets on the other of the two parts, thus yielding the relative positions as represented in FIG. 6. At this time, the faces are no longer in abutting relationship and the two parts may be secured together by rotating them so that the respective shoulders overlap and thereby secure the respective pins in the sockets. This is described in detail in my above-mentioned patent. During the course of assembling the electrical coupling it is to be observed that the respective faces are first brought into an abutting relationship and then are moved out of such relationship into a superposed relationship where the faces are not opposing each other but have been moved out of opposing relationship to the end that the rotary motion of FIG. 7 can take place to complete the connection. The superposed relation is also illustrated in FIG. 6. The overlapping portions of the shoulder are designated 30 in FIG. 3.

A cam means 32 is disposed between the face and the shoulder at the outermost portion of the shoulder. In the preferred embodiment using the 45° face, the cam means 32 is a smooth curved cam surface generally triangular in shape at the extreme portion of the shoulder and faces toward the first projection. As seen from FIGS. 1–9, the respective cam means of each part engage each other in the course of the pivotal motion of FIG. 7 when assembling the two parts 3, 5. The cam means on each part, by thus engaging the corresponding cam means on the other part, serves to advance the pin of one part into the socket of the other part responsive to the relative pivotal movement of the respective parts when the faces are in superposed position.

Also in the preferred embodiment, a locking cam means 34 is provided between the shoulder 24 on each part and the cam means 32 on the outermost end of the cam means. The locking cam means defines a notch-like recess on the shoulder which is adjacent the cam means 32 and which serves to separate the shoulder proper from the cam means 32. During the joining of the first part with the second part, the several locking cam means engage each other subsequent to the engagement of the several cam means 32 and effect a locking action by reason of the now-depending cam means engaging the notch forming the locking cam 34. The manner of engagement is discernable from FIGS. 1, 2 and 9.

Mention has been made of effecting an atmospheric-proof connector, for example, one which is waterproof or the like. To this end a compressible gasket means 36 is provided. Preferably, the gasket means is formed of any resilient impermeable polymeric material such as natural rubber, synthetic rubber, and the like. The gasket means seals the socket on one part when the pin of another part is inserted therein. The gasket is also compressed responsive to the cam means 32 engaging each other and forcing the pin into the socket against the resiliency of the gasket. A locking cam 34 is so arranged that the gasket remains at least partially compressed when the respective cam means 32 have been brought into the overlapping relationship designated as 30 on FIG. 3. The gasket member 36 is preferably formed in a circular annulus—i.e. is a flexible washer and has a hole in the middle. The pin 25 is shaped to receive the gasket 36, and may conveniently be undercut as at 38 in order to better retain the gasket. The gasket is preferably disposed so that some relative rotary movement is possible between the pin and the gasket, thus reducing the amount of force required during the pivotal motion (FIG. 7) which takes place during assembly and disassembly. It will thus be observed that the gasket member, when the coupling is assembled, is disposed in a compressed fashion between the several first and second projections.

It is to be understood that while the description has generally related to the first connecting part 3, the second connecting part is constructed in like fashion and to avoid prolixity the description thereof has not been repeated. From the foregoing it is evident that the respective connecting portions are constructed alike in the mechanical sense and that they are mutually engageable in order to form the mechanical connections to the end that an electrical junction of desired character is established by assembling the two parts to form the electric coupling 1 or other suitable electrical connecting means.

*Junction establishing means (FIG. 8)*

The junction establishing means 10 as represented in FIG. 8 is of a character such that the respective connecting parts 3, 5 can be constructed with the electrical portion thereof being made in like fashion, and preferably being made in identical fashion. An advantage of the FIG. 8 construction resides in increasing the interchangeability of parts and also in reducing the hazard of accidentally shocking the person who is assembling the respective parts.

The means 10 of FIG. 8 includes a stud 40 disposed in countersunk fashion within the socket 23. Preferably, the stud is disposed along the axis of the socket 40. The stud is connected to the wires 12 in any suitable fashion (e.g. FIG. 16). The stud is preferably mounted on an electrically conductive spring arm 41. The spring arm holds the stud in a position such that the arm is resiliently flexed by engaging sleeve 42 on the other part when the coupling is assembled, thus enhancing the electrical contact.

A second electrical contact means is secured in the pin 25 and constitutes a sleeve 42 arranged in countersunk fashion in the central portion of the pin. The sleeve 42 and stud 40 are advantageously arranged on the same axis and are coaxial with the common axis extending through the socket and the pin whereby assembling two parts constructed in this fashion the sleeve on each part engages the stud on the other part responsive to moving the several pins into the several sockets. The countersunk arrangement of the stud and sleeve serve to promote safety by reducing the chance of accidental shocks.

FIG. 16 represents one embodiment for connecting the wires 12 to the electric contact means 40, 42. The FIG. 16 construction can be used in those embodiments wherein the wire 12 is not moulded into the connecting part during the course of manufacture. As shown in FIG. 16, the wire is led through a conduit 45 fashioned in the body and the projection. The wire extends to a place adjacent the terminal bar 44, which may advantageously be an extension of either the sleeve or the stud, or both as shown in FIG. 8. A plastic screw 46 is positioned in a hole 47 adjacent the terminal bar 44. Advancing the screw 46 into the hole serves to position the wire 12 against the terminal bar, thereby to establish an electrical connection. The screw 46 is preferably of the type which is either countersunk or flush with the surface of the body 3.

A construction such as FIG. 16, or an equivalent construction, may be used in either of the projections on each part, or may be disposed in the body 6 of the part according to the dictates of the particular design.

*Receptacle for mounting*

FIG. 10 represents an electrical connecting means constituting a receptacle 51. Stated simply, the receptacle involves a connecting part 3 having a body 6 that includes a support means such as the receptacle 51 for mounting the connecting part 3 on a support such as a wall, ceiling, floor, switchboard or the like, generically designated as 52. The receptacle is advantageously constructed to allow adjustments to be made in the course of installing the same so that a neat and workman-like appearance is obtained.

The mounting means 51 includes a junction box 54 having a back 55 surrounded by walls generically designated as 56. The junction box is open on the front side, i.e. on the right side as viewed in FIG. 10. Electrical leads are brought in by any suitable means through a conventional knockout opening in the back 55, or in the sides. The embodiment illustrated shows two wires 12 brought in through the back, the wires being encased in flexible armor 57 of any conventional type and secured to the back by the nut and nipple fitting assembly 58 which provides means such as the nut 59 for securing the end of the cable to the junction box.

Inside the junction box is a sliding body support 60 which comprises a ring having an internal flange 61. The ring has straight sides 62 and a curved top and bottom 64. The curved top and bottom enhance the ability to make lateral adjustments so that the face plate 67 when installed will be properly aligned vertically. The support 60 is sized to form a sliding fit at the top and bottom and a loose fit along the sides whereby a rotation of the ring provides the desired adjustment. The body 3 is secured as by set screws 65 to a pair of lugs 66. The lugs are struck out of either one or both of the sides 62 (leaving holes 63 in the side from which struck) and are integral therewith. The body 3 preferably extends the full width between the opposed ring sides 62 for ease in assembling. The top 64 and bottom 64 are curved in a plane perpendicular to the plane of FIG. 10.

The sliding body support moves in and out of the junction box 54 so that adjustment can be made for walls of various thicknesses, an advantage in those instances where lath and plaster walls are used, since the plaster may be of various thicknesses and is applied generally after the box 54 is attached to the frame of the structure. A sliding box arrangement enables bringing the assembly 60 out to where it has proper relationship with the external surface of the wall whereby the face plate 67 may then be attached. The relationship of the face plate to the part 3 is important on those occasions when the receptacle is to be used as a portion of an electrical switch, as will be hereinafter described with relation to portions of FIGS. 10 and 11.

In the FIG. 10 embodiment, a pair of opposed wide elongated slots 68 is provided in the top and bottom walls 62. The longitudinal axis of the slots is parallel to the direction in which the sliding assembly moves in and out of the junction box. A screw 69 is fitted through each slot and has a head of a diameter larger than the maximum width of the slot. In this fashion, the screws 69 may be loosened, the sliding assembly adjusted to and fro, moved laterally, and rotated and then the screws tightened in order to make the requisite adjustments for wall thickness and vertical and horizontal alignment.

The face plate 67 is surrounded by a flange 70, the upper portion of which constitutes an oblique slot 72 which receives a corresponding oblique flange 74 extending from the forward portion of the sliding assembly 60. Preferably, the slot is at the top of the face plate. The bottom portion of the flange 70 contains a receiving slot 76 which has a cross section like a trapezoid and has the bottom side of the slot parallel to the path of entry of a bottom sliding box flange 78. This arrangement permits hooking the upper sliding box flange 74 into its slot 72 and then slightly pivoting the entire face so that the bottom sliding box flange 78 is received in the slot 76. Once the parts have been thus assembled, the face plate securing screw 79 is tightened whereupon it engages the flange 78 and snugs the face plate down against the upper sliding box flange 74, thereby placing that portion of the face plate between flanges 74, 78 in tension.

As will next be developed, the backside of the face plate cooperates with portions of the switch mechanism and advantageously provides a stop means for the various portions of the switch.

*Electrical switch (FIGS. 10 and 11)*

A switch according to the invention contemplates having first and second parts, each such part having a connector portion which mechanically mutually engages the connector portion of the other part and each of which is as described with respect to FIGS. 1–9. However, in the switch embodiment it is ordinarily not desired to include a gasket means 38, although the invention does comprehend doing so. A plurality of the hereinafter described switch contacts can be employed to provide a plural (e.g. double) pole switch or a plural (e.g. double) throw switch.

The second connecting part for the electrical switch embodiment is designated as the switch handle assembly 85, which includes a body portion 86 and a connector portion 8b.

The body portion includes a switch handle 87 arranged to extend outwardly of a face plate such as 67 when the switch is assembled. The body further includes the stop flanges 88. The stop flange has a triple cam surface advantageously formed by a flat on-position stop surface 90, a second off-position surface 92 and a third surface 93 which advantageously is tangent to both of the flat surfaces and formed as a radius about the axis of the pin and socket of the connector portion. Thus, the triple cam surface allows the switch to move from on to off position and vice versa and to engage the backside of the face plate at the on and off positions. The radius of the third surface 93 is such that no mechanical interference occurs with the backside of the face plate, and that the switch is positioned at the end points of its pivotal motion when the wings 88 are engaged with the face plate. An appropriate slot 95 is provided in the face plate to permit the motion of the switch handle.

The cam means and locking cam are preferably not provided on the electric switch embodiment, thus permitting a cooperation of the parts such as set forth in my above-mentioned patent.

The means for establishing an electrical junction is ordinarily different for the electrical switch than for the electrical coupling previously described in order to enable the making and breaking of electrical circuits during the switching action. To this end, as seen in FIG. 11, a leaf spring electrical contact 98 is provided on the second projection of the body 6 in such fashion as to surround the pin of the connector portion. A leaf spring 99 is provided on the connector portion of the switch handle assembly 85, and has a hole therein so that the socket in the first projection is surrounded by the spring member 99. Both of the members 98 and 99 are electrically conducting and have finishes such that they provide a rotary electrical contact which is maintained during all positions in which the switch handle connector portion is engaged with the body connector portion and with the faces of the respective connector portions in superposed relation.

An electrical conductor means 100 extends through the switch handle body from the leaf spring 99 to a switch blade 102. The switch blade 102 advantageously extends along the second projection of the switch handle assembly and past the pin thereof to a position such that it can engage the pair of spring contacts 103, 104 associated with the first connecting part. As shown in FIGS. 17 and 11, the pair of springs 103, 104 extends out toward, but fall short of, the socket on the first part 3. The respective contact members 102 through 104 are of a narrow leaf spring variety so that pivoting the switch handle will move the spring 102 out of electrical contact with the springs 103 and 104.

It will be appreciated that improved contact is achieved by employing a pair of springs 103, 104 but that only one spring has to be provided to establish any contact. However, it is preferred to employ the pair of springs whereby the switch handle member 102 can move between the cooperating pair of springs. A pair of springs 98 is preferred for similar reasons.

*Electrical fuse means (FIGS. 12 and 13)*

An electrical fuse according to the invention comprehends a first connecting part 3 constructed both as to the connector portion and as to the means for establishing electrical contact in the fashion described with respect to FIGS. 10 and 11. A plurality of the parts 3 may be mounted inside an appropriate receptacle whereby a bank of fuses may be installed, as is common, for example, in domestic housing arrangements. To simplify the description, corresponding parts have been given the same numbers, where applicable, as appear in FIGS. 1–11.

The second connecting part of an electrical fuse arrangement involves a fuse assembly 110 having a body 111 from which the connector portion 8b extends. The fuse body 110 also includes a transparent window member 112 of mica or other suitable material which looks in on a fuse cavity 114 in which is disposed a fuse metal electrical conductor means 115. The fuse metal is of any well known composition suitable for melting when an excess of current in a given voltage range flows through the fuse metal. It will be observed that the fuse metal member 115 serves as an electrical conductor means between the two leaf spring contacts 99, 102 which respectively constitute the means for electrically engaging the electrical contact means on the body 3. The sleeve 42 and stud 40 construction of FIGS. 1–8 can alternatively be used in lieu of the leaf spring structure of FIGS. 12, 13.

In using the fuse, the fuse body 110 is assembled to the first part 3 in the same fashion as described with respect to FIGS. 1–9. In this embodiment is not required that gasket means, locking cams, or cam means be employed in the preferred embodiment. However, less-preferred embodiments may on occasion include such features. The cam means may on occasion be advantageously employed, both for the fuse and for the switch as an aid to forcing the respective spring contact means into engagement with each other. However, it is preferred to employ a connector portion design of the character described in my above-mentioned patent, with the faces on the connector portion set at suitable angles.

Electric lamp embodiment (FIG. 14)

An electric lamp according to the invention contemplates an electric lamp body portion 120 which preferably includes a bulb 122 formed integrally with the connector portion 8b. The leads for the incandescent or other lighting element are brought out to the connector portion in the fashion described with respect to FIG. 8. It is preferred in this embodiment to employ the cam means and gasket whereby a waterproof and essentially atmosphere proof connection is established with the lamp socket connecting part 3.

Where is is desired to install a plurality of lamp bulbs, an appropriate arrangement of first connecting parts 3 may be dispersed around a common suporting body 125. Conventional means are employed for attaching the support body 126 to a wall, ceiling or the like. The electrical leads are brought in to the body 126 and electrical connections made either as presently known or as described above, or in other suitable fashion.

Multiple connector (FIG. 15)

A terminal block or other means for providing plural adjacent electrical connections is advantageously constructed using connector portions according to the invention. FIG. 14 has illustrated how a plurality of such are arranged on a common body. FIG. 15 extends this to a side by side relationship which enables installing either a plurality of lamp bulbs, or making a plurality of electrical connections for extension cords or the like. Moreover, FIG. 15 represents a manner for leading the wires through the terminal block portion whereby a plurality of parallel circuits may readily be realized. The wire 130, represented by short dotted lines, has plural branches designated as the branch 131 and the branch 132 which extend to adjacent first projections. It will be observed that FIG. 15 shows a terminal block body 135 wherein first projections 21 alternate with second projections 22.

A second electrical lead 136, represented by the alternating long and short dashes, turns into the branches 137 and 138 which respectively extend to the second projections. Thus, an electrical load connected between branches 131 and 137 finds itself in parallel with a load connected between branches 132 and 138, assuming the leads 130 and 136 are connected to a common voltage and current source such as a battery or electrical generator.

FIGURE 18

The embodiment of FIG. 18 is directed to a connector having an electrical connecting means adapted to facilitate molding of the connector in an injection mold or the like. The body and connector portions are as described above, but the electrical connecting means includes a unique sleeve 150 in the pin 25 and a unique stud 156 in the socket which are provided in lieu of their respective counterparts 42, 40 in FIG. 8. When two such connectors are assembled (e.g. FIGS. 1–3) the sleeve 150 of each connector receives the stud 156 of the other connector in such fashion as to establish an electrical junction. Only one connector is described, it being understood that two such connectors are employed in the fashion described above, e.g. in relation to FIGS. 1–9.

The sleeve 150 includes a support member 152 which preferably extends through the second projection and the body to a position where the wire 12 can be attached thereto. A contact receptacle or sleeve-like ferrule 154 preferably comprising a hollow cylindrical member is disposed on the end of the support 152 within the pin where it is recessed to reduce the danger of an accidental shock. The member 152 and ferrule 154 are preferably of one piece construction, and are formed of an electrical conductor such as copper by a process such as casting, forging or the like.

During molding the sleeve is mounted on a pin in the molding die by positioning the ferrule on the pin. When plastic is admitted into the die it flows around the sleeve 150 but cannot flow into the hollow part of the ferrule because the die pin is there. A similar action using a tube on the stud engager is explained below.

The stud 156 includes a support member 157 which preferably extends through the first projection and the body to a position where the wire 12 can be attached thereto. A spring ferrule insert 158 preferably comprising a hollow cylindrical member is disposed on the end of support 157 within the socket where it is recessed to reduce the danger of accidental shock. The member 157 and ferrule insert 158 are preferably of one piece construction and formed of an electrical conductor such as copper.

In order to provide a spring action to enhance the electrical contact between the sleeve and the stud, the ferrule insert preferably includes a plurality of partly cylindrical spring members 160, 161 and 162. Each spring member has a reversely flanged flare at the end furthest from the stud supporting member 157. The flare 164 protrudes outwardly and the reverse flange 166 extends radially inwardly from the flare. When two connectors are assembled, the flare of one connector springs into junction-establishing electrical engagement with the inside walls of the ferrule 154 of the other connector.

During molding the stud is mounted on a hollow pin in the molding die by positioning the ferrule insert inside the hollow pin. When plastic is admitted into the die it flows around the die pin to form the socket 23 but cannot flow into the hollow part of the pin or ferrule insert because the die pin and stud present a sealed structure. The die pin inside diameter is such as to define the cylindrical walls of the socket during molding. The die pin wall thickness provides the spacing between the ferrule insert and the ferrule. The ferrule 154 and insert 158 are preferably coaxial.

Included matters

The body and connector portions of the above-described electrical connecting means are preferably of a suitable electrical insulating material. Such materials may comprise natural rubber, synthetic rubber, various types of plastics such as those sold under the trade names "Lucite" and "Bakelite" and as further defined in standard chemical dictionaries. During the fabrication of electrical connection means, the invention comprehends molding the various contacts and lead wires into the body and connector portions. The invention also comprehends manufacturing connector means such that wires may be lead thereinto and connected to the terminals in a suitable fashion as described with respect to FIG. 16.

It will be observed that the various types of receptacles, plural connecting means, and single connecting means particularly as set forth in FIGS. 10–15 may be modified to incorporate various features of the invention. Thus, the embodiment of FIG. 10 may have an appropriate first part 3 disposed therein so that a lamp bulb, extension cord constructed in accordance with FIGS. 1–9, a switch, or a fuse may selectively be installed. The embodiments of FIGS. 14 and 15 are readily adaptable to connecting either to light bulbs, or to extension cords for power tools and the like and to that end the respective connector portions are interchangeable either for bulbs, cords or so forth.

On occasion a detent means is employed whereby the parts are not immediately capable of being disassembled. One such detent means is illustrated in my above-mentioned patent. Detent means may be used to advantage in switches, fuses, and couplings.

Once a direct current system has been correctly wired using electrical connecting means as herein described, the polarity of the individual connections is maintained correct because each connection (e.g. coupling, fuse) fits together only one way. Different connections can be identified, if desired, by making the parts thereof of selected colors, or other means used to match the two parts at each connection.

The mechanical and electrical components of each connector portion are to be distinguished. The electrical components are those generically described above as the means 10 for establishing an electrical junction and more specifically as the FIG. 8 stud 41 and sleeve 42 and as the FIGS. 11 and 13 leaf spring contacts 98, 99, 102, 103 and 104. The mechanical components, referred to also as the structured portions, and the preferably constructed-alike portions, do not include the means 10 but do include on each part the two projections and the associated pin, socket, shoulder and face, i.e. the mutually engageable and interlocking structure which serves to bring and maintain together the junction-establishing means 10 on the respective parts.

The principal mechanical components remain rigid and unflexed in the course of assembly and disassembly. Of course, the sealing means such as gasket 36 do compress, and the various springs in the junction-establishing means 10 also flex.

An O-ring can be used in lieu of the gasket 36 or can be used in combination with the gasket. The O-ring can be seated on one part on the pin in the undercut recess 38 and arranged to sealably engage the vertical cylindrical wall of the socket 23 on the other part. Alternatively, the O-ring can be seated in a recess (not shown) in the socket to sealably engage the circular portions of the pin. The latter embodiment is advantageously used where a double seal is desired as when the cams 32, 34 and the gasket 36 is used in combination therewith.

In the electric lamp embodiment, the term "bulb" refers to the known combination of an evacuated envelope surrounding an electrically conductive filament, or the equivalent thereof.

In the switch and fuse embodiments the various contact springs 98, 99 and 102–104 are electrically conductive members of low resistance, for example, being of copper or a copper alloy.

While various arrangements, embodiments, materials, modes and manners of construction have been described, these are to be taken as being illustrative of the presently preferred embodiments of the invention and are not to be restricted solely to those means presented and described above. While particular theories of operation are presented, it is to be stressed that the invention resides in the means for effecting the various functions and not in the various theories of operation. Moreover, the invention comprehends all of those changes, modifications, substitutions of equivalents, as would be obvious to one skilled in the art and within the spirit as well as the letter of the annexed disclosure and claims.

I claim:

1. An electrical connecting means for establishing an electrical junction, said means comprising
   a first connecting part and a second connecting part adapted to be connected to said first connecting part, each of said parts having a body portion,
   a connector portion mounted on said body portion, the connector portions on each of said first and second parts being mutually engageable with each other, and
   means for establishing an electrical junction responsive to connecting said first and second parts by mutually engaging the respective connector portions on each part,
   each of said connector portions including a first projection having one end connected to said body portion and the other end extending outward therefrom with a socket located in said other end,
   a second projection parallel to and spaced apart from said first projection and having one end connected to said body portion and the other end extending outward therefrom the same distance as the first projection,
   a shoulder disposed on said second projection and extending toward said first projection,
   a pin on said second projection and extending away from said first projection,
   a diagonal face on said shoulder terminating the outward extension of said shoulder from said body portion,
   said shoulder being spaced from said first projection a distance slightly greater than the width of said second projection plus the length of said pin,
   whereby the second projection and pin on each one of said parts is insertable between the first and second projections on the other one of said parts,
   said face on each of said shoulders being located outwardly of said body portion a distance such that the pin on each of said parts is alignable with the socket on the other end of said parts upon the faces being brought into engagement when the second projection of each part is inserted between the first and second projection on the other part,
   whereby said electrical connecting means is assembled from said first and second parts by aligning the pin on each part with the socket of the other part, moving the parts laterally to insert each respective pin in the socket of the other part and rotating the parts relative to each other to bring the respective shoulders into abutting relation.

2. An electrical connecting means according to claim 1 wherein
   both of said means for establishing are constructed alike and each includes
   a stud centrally disposed within said socket, a sleeve-like member disposed coaxially with said stud within said pin recess and a central recess in said pin in the end furthest from said second projection,
   whereby, upon said electrical contacting means being assembled as aforesaid, the stud of one part is mechanically and electrically engaged by the sleeve-like member of the other part.

3. An electrical connecting means according to claim 1 wherein said body portion of said first connecting part is a light bulb.

4. An electrical connecting means according to claim 1 wherein first part body portion further includes
support means for mounting on a support said first connecting part.

5. An electrical connecting means according to claim 1 wherein said first connecting part body portion comprises
a switch handle and the first connecting part means for establishing includes
a first electrical contact on said first projection
a second electrical contact on said second projection, and
an electrical conductor means extending through said body portion between said first and second electrical contacts.

6. An electrical connecting means according to claim 1 wherein said first connecting part body portion includes a recess covered by
a transparent window and the first connecting part means for establishing includes
a first electrical contact on said first projection,
a second electrical contact on said second projection, and
an electrical fuse element that melts upon excess current flowing therethrough positioned in said recess to be seen through said window and connected between said first and second electrical contacts.

7. A connector portion for each part of an electrical connecting means which means establishes an electrical connection by joining at least two of said parts,
each of said connector portions comprising
a first projection having one end connected to said part and the other end of said first projection extending outward therefrom,
a second projection parallel to and spaced from said first projection and having a pin located in its outwardly extending end,
said pin extending away from said first projection,
said first projection including a socket in the outwardly extending end extending toward said second projection in axial alignment with said pin,
a shoulder on said second projection in the space between said projections, the distance between the shoulder and the first projection being greater than the distance through the second projection and pin, and
electrical circuit contact means extending through each of the projections with an exposed electrical contact means located in the socket and on the end of each pin,
whereby upon insertion of the second projection of the connector portion of one part between the shoulder and first projection of the connector portion of another part, the pin and socket of said one part can be moved axially into mating engagement with the pin and socket of said other part to establish an electrical connection.

8. A connector portion according to claim 7 wherein the electrical contact means in the first projection includes a contact stud supported in said socket to extend toward said second projection, and wherein the electrical contact means in the second projection of each part includes a second socket in said pin, and
a contact receptacle within said second socket for receiving one of said studs in electrical contact.

9. A connector portion according to claim 8 further comprising a compressible gasket means for sealing said socket in the first projection of one of said parts upon a pin in the second projection of another of said parts being inserted therein.

10. A connector portion according to claim 7 wherein said shoulder includes a locating surface positioned to engage a corresponding locating surface on the other part whereby upon insertion of the second projection of one part into the space between the first and second projection of the other part the locating surfaces will be brought into engagement to axially align the socket and pin of one part with the socket and pin of the other part.

11. A connector portion according to claim 7 wherein said shoulder on the second projection of each part includes a cam face positioned to engage a similar cam face on the other part whereby upon pivoted motion of one part with respect to the other, the cam faces are brought into mating engagement to seat the pin and socket of one part in the socket and pin of the other part.

12. A connector portion according to claim 11 wherein said cam face includes a locking means to lock the two parts together when the pin and socket of one part is seated in the pin and socket of the other part.

13. A connector portion according to claim 7 where one of said parts includes a light bulb.

14. A connector portion according to claim 7 wherein one of said parts includes an internal recess closed by
a transparent window, said electrical circuit contact means for said one of said parts includes
a first electrical contact on said first projection,
a second electrical contact on said second projection, and
an electrical fuse element positioned in said recess and electrically connected between said first and second electrical contacts so that said element melts upon excess current flowing therethrough.

References Cited by the Examiner
UNITED STATES PATENTS

| 1,285,223 | 11/18 | Kilmer | 200—51 |
| 1,689,824 | 10/28 | Goelz | 339—47 |
| 1,834,150 | 12/31 | Goelz | 339—47 |
| 2,298,172 | 10/42 | Rose et al. | 200—115.5 |
| 2,355,913 | 8/44 | Simon | 339—75 |
| 2,449,660 | 9/48 | Lawhorne | 339—75 |
| 2,572,448 | 10/51 | Child | 339—75 |
| 2,706,225 | 4/55 | Freeman | 200—51 |
| 2,963,734 | 12/60 | Huget | 16—161 |

FOREIGN PATENTS 71,134 9/93 Germany.

BERNARD A. GILHEANY, *Primary Examiner.*